Figure 1:
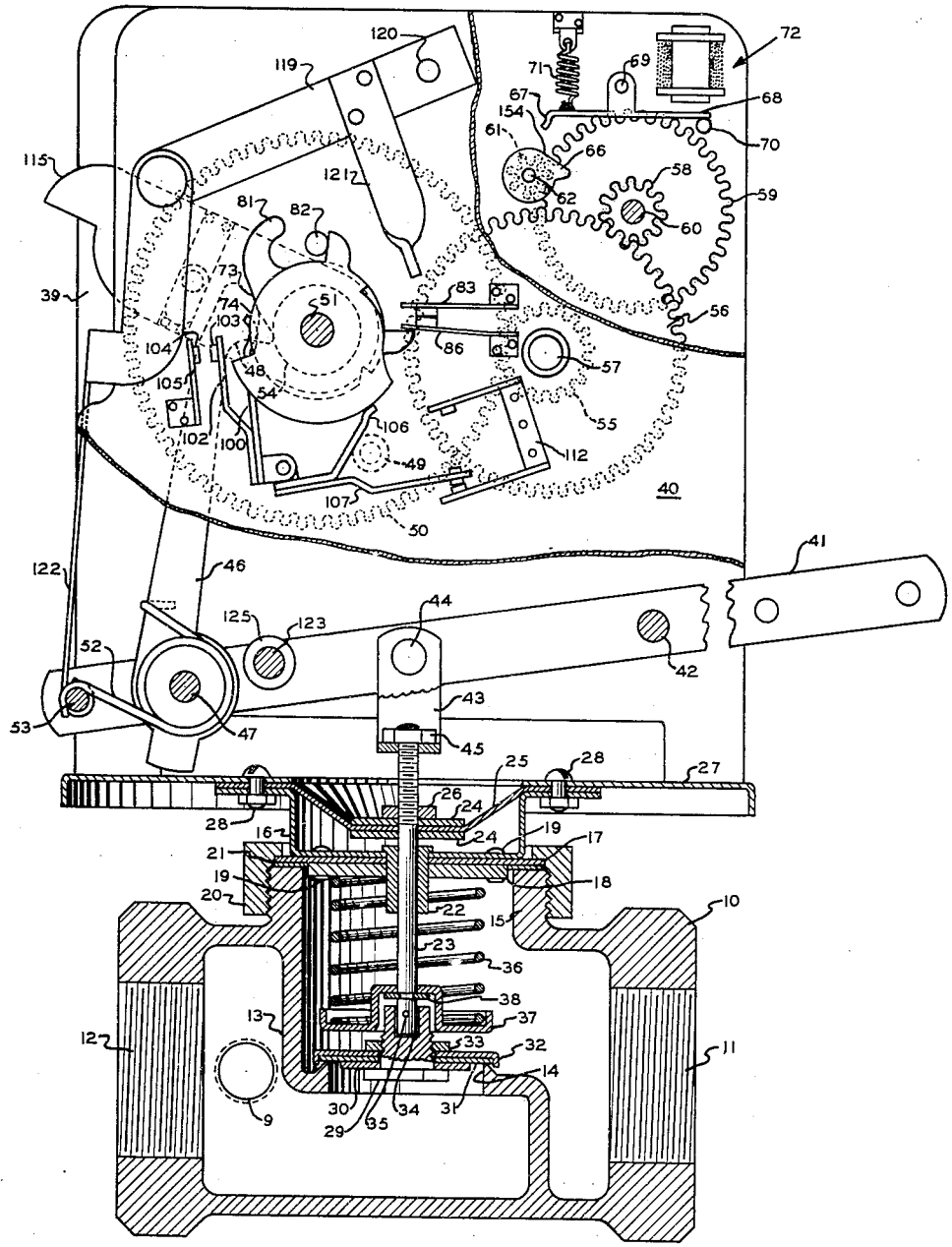

Feb. 4, 1936.  W. H. GILLE  2,029,615
TWO-STAGE VALVE
Filed Nov. 11, 1933  3 Sheets-Sheet 1

Inventor
WILLIS H. GILLE

By George H. Fisher
Attorney

Feb. 4, 1936. W. H. GILLE 2,029,615
TWO-STAGE VALVE
Filed Nov. 11, 1933 3 Sheets-Sheet 2

Inventor
WILLIS H. GILLE
By George H. Fisher
Attorney

Feb. 4, 1936.                W. H. GILLE                2,029,615
TWO-STAGE VALVE
Filed Nov. 11, 1933          3 Sheets-Sheet 3

Inventor
WILLIS H. GILLE

By George H. Fisher
Attorney

Patented Feb. 4, 1936

2,029,615

UNITED STATES PATENT OFFICE 2,029,615

TWO-STAGE VALVE

Willis H. Gille, St. Paul, Minn., assignor to Minneapolis-Honeywell Regulator Company, Minneapolis, Minn., a corporation of Delaware Application November 11, 1933, Serial No. 697,685

18 Claims. (Cl. 236—74)

The present invention relates to the automatic positioning of an element such as a fluid flow controlling element in response to changes in a condition or the changes in position of a movable member. Specifically, the invention relates to the automatic positioning of a fuel flow controlling valve in accordance with the demands for heat.

In controlling the flow of fuel, such as gas, to a burner, it is often desirable to furnish a relatively large initial flow so as to obtain proper ignition and to then automatically reduce the flow to the desired point. If the flow of gas were established initially at the desired rate and if the rate should be relatively small, there is extreme danger of improper ignition, such as a pop-back and burning in the mixer in the case of a gas burner. Therefore, the desirability of first supplying a larger flow of fuel to the burner to insure proper ignition.

One of the objects of the present invention is the provision of mechanism for controlling a single fuel controlling valve in such manner that in moving from a closed position the valve first opens relatively widely and then returns to a more nearly closed position whereby a large flow of fuel is first obtained for proper ignition and thereafter the flow of fuel is reduced to the desired point.

A further object of the invention is the provision of controlling mechanism for controlling the flow of fuel to a burner, either by a single valve or by a plurality of valves, in such manner that on an initial low demand for fuel a large flow is initially established and thereafter the flow is automatically reduced to the desired value, together with means for maintaining the reduced flow until the demand is appreciably lower than that at which the flow of fuel was initially established.

A further object of the invention is the provision of a control mechanism for controlling the flow of fuel to a burner in response to the movements of a movable member, the arrangement being such that a large initial flow is first established for proper ignition and is thereafter automatically reduced when the movable member reaches a first point during motion in one direction and maintaining the reduced flow upon return movement of the movable member until the same has deviated from said first point and reached a second point spaced from the first.

Another object of the invention is the provision of controlling mechanism for controlling the flow of fuel to a burner, said controlling mechanism including starting and holding switches in control of electrically actuated means for establishing a large flow initially and thereafter automatically reducing the flow upon closing of said starting switch and maintaining this smaller flow by said holding switch, at least one of said switches being controlled in accordance with the demand for heat.

Further objects of the invention include the combination of the above systems with means for again establishing a large flow of fuel to the burner upon an increase in the demand for heat.

Briefly, the specific mechanism to be hereinafter described in detail comprises a single valve which is moved to substantially full open position by a rotary electrical motor upon a small demand for heat, the motor being deenergized when the valve has reached substantially full open position. The valve thereupon returns toward closed position but is latched in an intermediate position by the energization of an electromagnet. If the demand for heat is thus satisfied, the electromagnet is deenergized and the valve moves to closed position but if the demand for heat increases, the motor is again energized to completely open the valve and the valve is maintained in open position by stalling of the motor.

Other objects of the invention include the specific combination of elements by which these operations are obtained.

Other objects of the invention include the provision of means whereby the flow controlling mechanism may be manually operated to permit flow of fuel to the burner upon the occurrence of a power failure, together with means for returning the apparatus to automatic control upon the resumption of power.

Further objects of the invention will become apparent from the detailed description of the invention, the accompanying drawings and the appended claims.

Figures 2, 3:
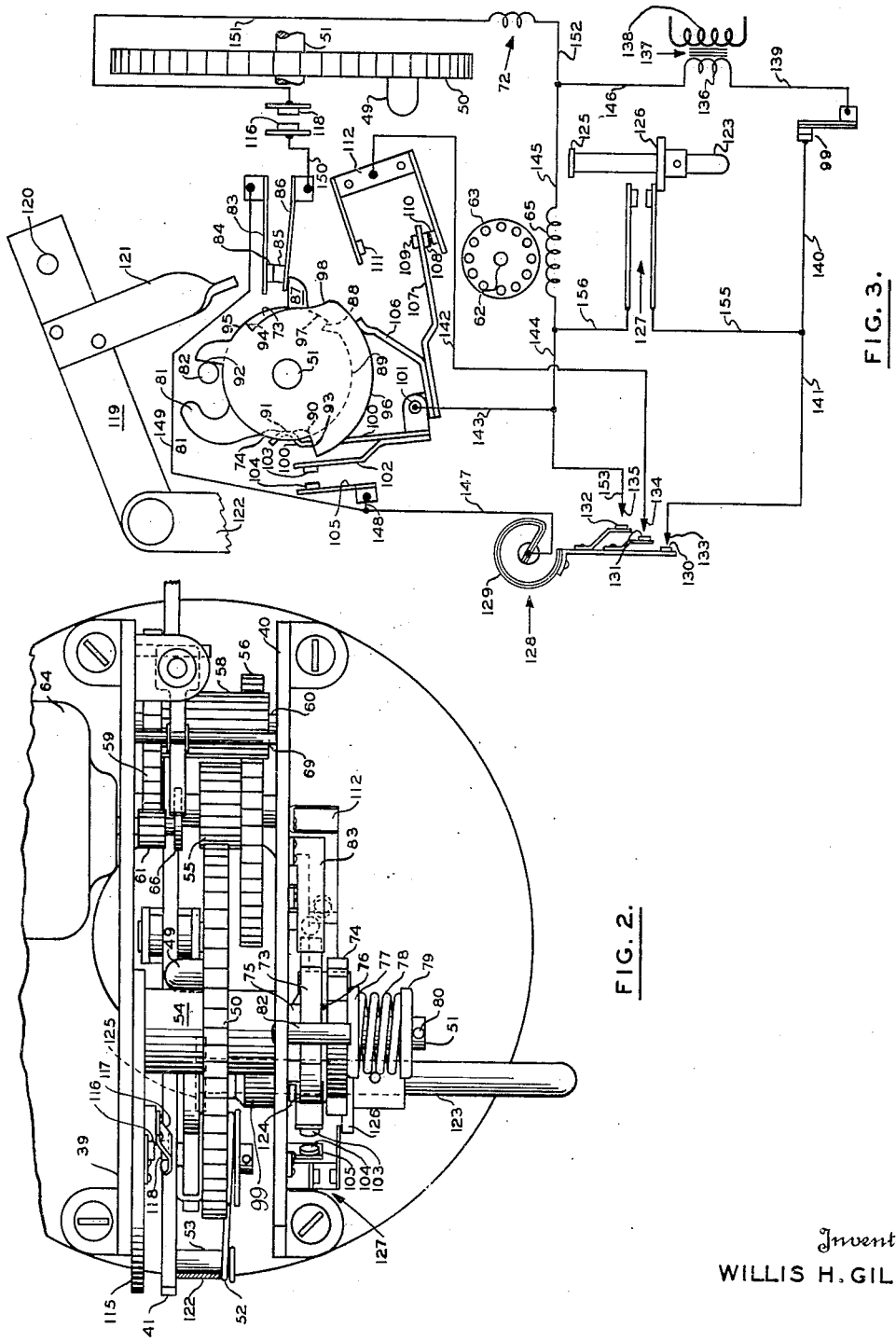
Figure 7:
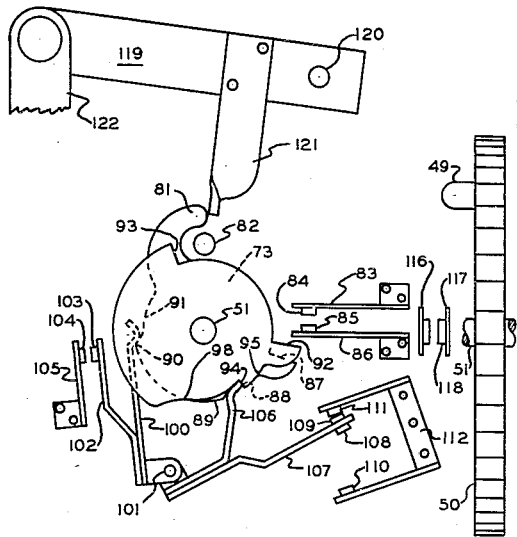
Figure 6:
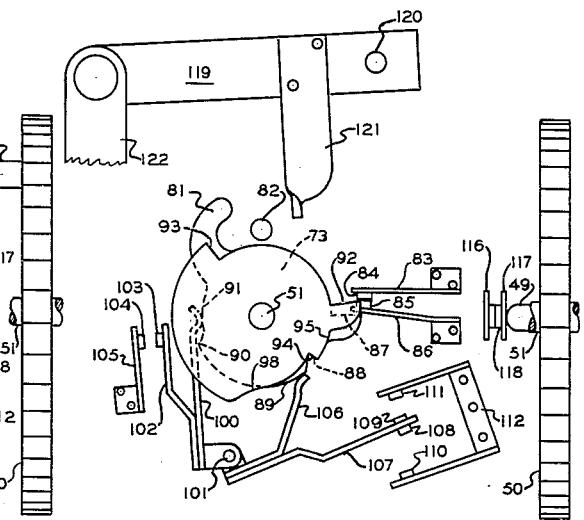
Figure 4:
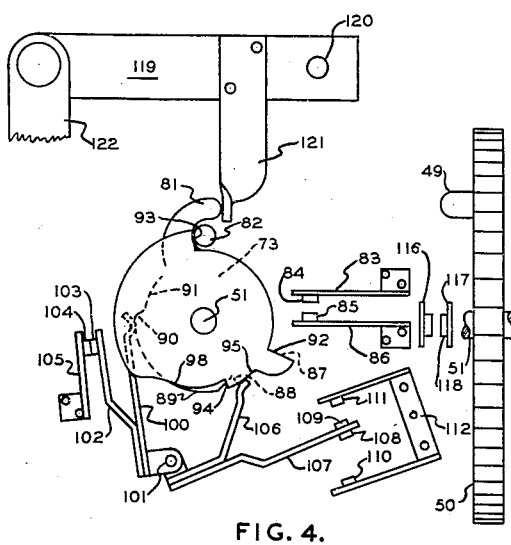
Figure 5:
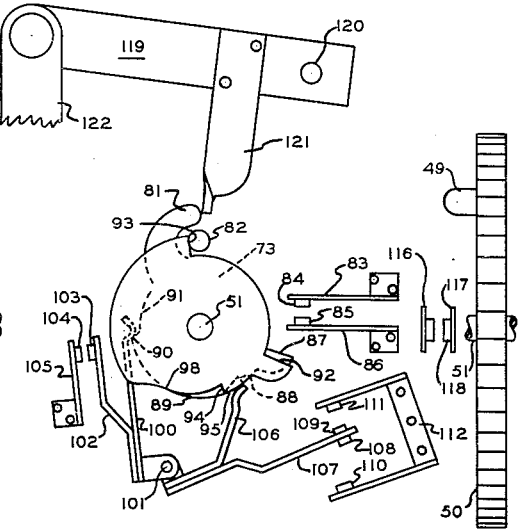

In the drawings,

Fig. 1 is a side view of a valve provided with my novel controlling mechanism, parts being broken away and the cover being removed to show the details thereof more clearly, Fig. 2 is a top view of the mechanism of Fig. 1, Fig. 3 is a schematic wiring diagram showing the various switches and cams in the positions they assume when the valve is closed and there is no demand for heat, Fig. 4 is a similar view of the cams and switching mechanism showing their positions when the valve has been moved toward open position on an initial call for heat, Fig. 5 is a similar view showing the motor controlling switch moved to open position as a result of the valve having been moved to substantially full open position, Fig. 6 is a similar view showing the valve returned to half-open position and maintained therein by the energization of the electromagnet, and Fig. 7 is a further view of the valve switching mechanism and cams in the positions they assume when the valve has been moved to full open position and is being maintained therein by stalling of the motor upon a larger demand for heat.

Referring first to Figs. 1 and 2 of the drawings, the invention as herein illustrated comprises a valve casing 10 having outlet and inlet ports 11 and 12 respectively, and a partition 13 therebetween which is provided with a valve opening 14. An opening 9 provided in casing 10 may be utilized to supply a pilot light if desired. The valve casing 10 is further provided with a vertically extending cylindrical portion 15 that is provided with screw threads on its outer surface. A cup-shaped member 16 has a large disc 17 and a smaller disc 18 secured to its under side by any suitable means such as the rivets 19. A bonnet 20 engages disc 17 and cooperates with the screw threads formed on extension 15 to clamp cup member 16 and discs 17 and 18 to valve casing 10. A sealing gasket 21 is preferably interposed between cylindrical extension 15 and disc 17 to prevent the escape of gas or other fluid flowing through the valve casing 10. A guide bushing 22 for a valve stem 23 passes through cup member 16 and discs 17 and 18 and is preferably secured to cup member 16 by having its end peened over. The upper portion of valve stem 23 is threaded and has a pair of diaphragm clamping discs 24 threaded thereon. A diaphragm 25 is clamped between disc 24 and a nut 26 threaded on valve stem 23 engages the upper diaphragm clamping disc 24 to help retain it in its proper position. Diaphragm 25 acts as a sealing-off diaphragm to prevent the escape of gas from valve casing 12 to the atmosphere and is clamped between a circular base plate 27 and cup member 16 by means of screws and nuts 28.

A screw 29 first receives a washer 30 then a valve disc 31 and a valve disc retainer 32 which are clamped on screw 29 by means of a nut 33. Screw 29 is provided with a bore 34 of somewhat larger diameter than the valve stem 23 and loosely receives the lower end of valve stem 23. Valve stem 23 is secured to screw 29 by a small pin 35 which passes through valve stem 23 and screw 29. A coil spring 36 has its upper end abutting disc 18 and its lower end abutting a spring retainer 37 which is slidably received on valve stem 23 and has its downward motion limited by a washer 38 that engages a circumferential groove formed in valve stem 23. In this manner valve disc 31 is constantly biased to close valve opening 14 by coil spring 36.

Base plate 27 has a pair of plates 39 and 40 secured thereto which support the various operating mechanisms for moving valve disc 31 away from valve opening 14 against the bias of coil spring 36. A lever 41 is pivoted on a shaft 42 which is journalled in plates 39 and 40. A U-shaped member 43 is loosely pivoted to lever 41 as indicated at 44 and loosely receives the upper end of valve rod 23 which is supplied with a nut 45 whereby clockwise rotation of lever 41 about its pivot causes valve disc 31 to be raised against the bias of coil spring 36.

Lever 41 is actuated by a link 46 which has one of its ends pivoted near the left hand end of link 41 as indicated by the pin 47. The upper end of link 46 is provided with a hook 48 which is adapted to be engaged by a crank pin 49 that is carried by a large gear 50. The large gear 50 is secured to a shaft 51 which is in turn journalled in plates 39 and 40. A spring 52 is wound about a pin 53 carried by lever 41 and extends around pin 47 and link 46 to bias the upper end of link 46 into engagement with the hub 54 of large gear 50.

Gear 50 meshes with a pinion 55 which is integral with a gear 56 and this pinion and gear assembly is secured to a shaft 57 journalled in plates 39 and 40. A similar pinion 58 meshes with gear 56 and is integral with a gear 59. This gear and pinion assembly is secured to a shaft 60 which is also journalled in plates 39 and 40. Gear 59 meshes with a motor pinion 61 which is mounted upon a motor rotor shaft 62. Rotor shaft 62 carries a rotor 63 of a motor 64 which is mounted upon the rear face of plate 39. The motor 64 is provided with a field winding 65 (see Fig. 3).

Upon energization of the field winding 65 of motor 64, gear 50 is driven at reduced speed in a clockwise direction (as viewed in Fig. 1) and after a partial rotation of gear 50 the crank pin 49 carried thereby engages the hooked end 48 of link 46 to raise the link 46 and rotate lever 41 about its pivot 42. In this manner, the valve disc 31 is raised away from valve opening 14 against the bias of coiled spring 36. Similarly, upon deenergization of field winding 65 of motor 64, coiled spring 36 rotates the parts in the reverse direction to the position shown in Fig. 1 unless other means (to be hereinafter described) operate to maintain the valve disc 31 in its raised position. It should be noted that crank pin 49 and the hook 48 form a one way connection whereby crank pin 49 may continue rotating in counterclockwise direction after the valve has been fully closed by coiled spring 36.

The mechanism thus far described is not new with the present inventor and is merely exemplary of one type of mechanism to which the instant invention may be applied. The novel switching mechanism and other elements by which the novel features of the instant invention are obtained will now be described.

The rotor shaft 62 carries a stop member 66 which is secured to rotor shaft 62 and is normally unimpeded in its rotary movement. However, under certain conditions, the extended end 67 of an armature 68 is adapted to be moved into the path of rotation of stop member 66 to prevent rotation of rotor shaft 62 and the various gears and pinions connected thereto. The armature 68 is pivoted on a pin 69 which is mounted in plates 39 and 40 and is normally biased into engagement with a stop pin 70 by means of a spring 71. An electromagnet 72 of usual construction is mounted between plates 39 and 40 and is adapted, upon energization, to attract armature 68 against the bias of spring 71. Such attraction of armature 68 moves the extended end 67 thereof into the path of rotation of stop member 66 for the purpose hereinbefore pointed out.

A reduced portion of shaft 51 extends forwardly from plate 40 for an appreciable distance and has mounted thereon a rear cam 73 and a front cam 74. A bushing 75 is interposed between rear cam 73 and the shoulder formed in shaft 51 by the reduced portion thereof. A similar bushing 76 is placed between cams 73 and 74. Another similar bushing 77 is placed in front of cam 74. A coiled spring 78 bears against bushing 77 and is compressed by a washer 79 which is held on shaft 51 by means of a pin 80. In this manner, the rear and front cams 73 and 74 are frictionally coupled to shaft 51 whereby they rotate therewith when free to do so but may remain stationary or move in opposition to the shaft 51 when necessary.

The rear cam 73 is provided with a hooked extension 81 which cooperates with a stop pin 82 carried by plate 40 whereby the clockwise rotation of rear cam 73 is limited. A relatively stiff switch arm 83 carries a contact 84 which is adapted to cooperate with a contact 85 carried by a relatively flexible switch arm 86. Switch arms 83 and 86 are suitably carried by plate 40 through the necessary insulating means (not shown) the arrangement being such that contact 85 is normally disengaged from contact 84 but is adapted to be moved into engagement therewith by a stop 87 formed on cam 73. Upon counter-clockwise rotation of cam 73, stop 87 engages switch arm 86 and moves contact 85 into engagement with contact 84. Thereafter the relatively stiff switch arm 83 prevents further counterclockwise rotation of rear cam 73 and thereby acts as a stop. This rear cam is also provided with a notch 88, a dwell 89, an inclined surface 90, a dwell 91 and a dwell 97.

The front cam 74 is provided with stops 92 and 93 which cooperate with stop pin 82 to respectively limit counter-clockwise and clockwise rotation of cam 74. Cam 74 is also provided with a notch 94, a dwell 95, a dwell 96 and an inclined surface 98.

Rear cam 73 is engaged by a cam follower 100 which is pivoted at 101 and carries a flexible blade 102 to the free end of which is secured a contact 103. Contact 103 cooperates with a contact 104 carried by a relatively stationary switch arm 105. Both cams 73 and 74 conjointly control the movements of a cam follower 106 which is likewise pivoted at 101 and carries a flexible blade 107. Blade 107 supports a pair of contacts 108 and 109 which respectively cooperate with contacts 110 and 111 carried by a bracket 112. It will be understood that these various cam followers and switch arms are suitably mounted upon plate 40 through appropriate insulating means.

A block of insulating material 115 is mounted between plates 39 and 40 and is pivoted concentrically with shaft 51. This block of insulating material 115 supports a stationary contact 116 and a flexible blade 117 which carries a cooperating contact 118. Blade 117 is adapted to be engaged by the end of crank pin 49 whenever the same is rotated in either direction to a point wherein the link 46 has moved the valve disc 31 to a substantially half open position when the parts are in the position shown but block 115 may be adjusted so that contacts 116 and 118 are closed at other positions of valve disc 31.

A link 119 is pivoted to plate 40, as indicated at 120, and carries a cam operating arm 121 which is adapted to engage the stop extension 81 of cam 73 under certain conditions. The link 119 is actuated by a link 122 which is connected to pin 53 and therefore moves in accordance with the movements of valve disc 31.

A manually operable pin 123 is journalled in plate 40 and a bearing 99 carried thereby and is normally biased to the position shown in Fig. 2 by means of a spring 124. The inner end of pin 123 is provided with an enlargement 125 which normally bears against the extended end of bearing 99 under the bias of the spring 124. If the extended end of lever 41 be manually depressed, inward movement of pin 123 will cause its enlarged end 125 to move under the opposite raised end of lever 41 to maintain the same in its raised position. The enlargement 125 will bear against the rear face of lever 41 whereby the pin 123 cannot be returned to its normal position by the coiled spring 124. In this manner, the valve disc 31 may be moved to a partial open position and latched therein. The pin 123 has another enlargement 126 which upon manual inward movement of pin 123 operates to close a recycling switch generally indicated at 127.

The valve of the present invention is adapted to be operated by any movable member or condition responsive device such as the room thermostat generally indicated at 128. This room thermostat comprises a coiled bimetallic element 129, having one of its ends secured, and operating blades 130, 131 and 132. Upon a fall in the temperature to which bimetallic element 129 responds, blade 130 first engages a contact 133. On continued temperature fall, blade 130 flexes and blade 131 engages a contact 134. Upon a still further temperature fall, blades 130 and 131 flex and blade 132 engages a contact 135. It is to be distinctly understood that the room thermostat 128 is merely illustrative of any one of a number of elements or devices which could be utilized to control the operation of the flow controlling mechanism.

Low voltage power is supplied by the low voltage secondary 136 of a step down transformer 137 having a high voltage primary 138. An electric safety pilot 99 of any of the well known constructions may be included in the control circuit to be hereinafter described, if desired.

*Operation*

Referring now particularly to Figs. 3 to 7 inclusive of the drawings, the operation of the valve apparatus will now be described. Fig. 3 shows a schematic wiring diagram of the entire system with the various switches and cams in the positions which they assume when the valve is closed, it being noted that switches 103—104, 109—111 and 116—118 are all open whereas switches 108—110 and 84—85 are closed, the latter by virtue of stop 87 of cam 73. Stop 92 of cam 74 is in engagement with pin 82. Also all of the thermostat blades are disengaged from their respective contacts.

Now, if the temperature to which bimetallic element 129 responds lowers so as to bring blade 130 into engagement with contact 133, and then bring blade 131 into engagement with contact 134, an energizing circuit for field winding 65 of motor 64 will be established as follows: secondary 136, wire 139, safety pilot 99, wire 140, wire 141, contact 133, blade 130, blade 131, contact 134, wire 142, contact 110, contact 108, blade 107, wire 143, wire 144, field winding 65, wire 145 and wire 146 to the other side of secondary 136. Energization of field winding 65 rotates shaft 51 and gear 59 in clockwise direction as viewed in Fig. 1 to first take up the lost motion between crank pin 49 and hook 48. During this rotation of shaft 51, cams 73 and 74 are also rotated in a clockwise direction. Initial rotation of these cams causes cam follower 100 to ride up inclined cam surface 90 of rear cam 73 to move contact 103 into engagement with contact 104 whereby a holding circuit for field winding 65, independent of blade 131 and contact 134 and contacts 108 and 110, is established as follows: secondary 136, wire 139, safety pilot 99, wire 140, wire 141, contact 133, blade 130, bimetallic element 129, wire 147, wire 148, contacts 104 and 103, flexible blade 102, wire 143, wire 144, field winding 65, wire 145 and wire 146 to the other side of secondary 136. This initial movement of cams 73 and 74 also moves stop 87 from engagement with flexible switch arm 86 whereupon contacts 84 and 85 separate.

During this initial movement of gear 50 and shaft 51, crank pin 49 has approached the hooked end 48 of link 46 and after the above described holding circuit has been established the crank pin 49 begins to raise link 46 to open the valve. Rear cam 73 only moves a relatively short distance until stop extension 81 engages stop pin 82 and thereafter further movement of cam 73 in a clockwise direction is prevented. Shortly after contacts 103 and 104 have been closed by movement of cam 73, cam 74 has moved to a position wherein follower 106 rides down surface 98 of cam 74 and on to dwell 97 of cam 73 with the result that contact 108 moves out of engagement with contact 110 to open the initial energizing circuit for field winding 165. However, contact 109 does not move into engagement with contact 111.

When the valve has been moved to its half open position, crank pin 49 closes contacts 116 and 118 but it will be noted that these contacts are in series with contacts 84 and 85 which were initially closed but were immediately opened. Therefore, this closure of contacts 116 and 118 at this time does not complete any circuits. As the shaft 51 continues to rotate, cam 74 will rotate in unison therewith and the notch 94 thereof will pass under cam follower 106. However, cam follower 106 is prevented from moving into notch 94 by reason of its resting upon the surface 97 of cam 73.

Thus, when the valve has reached a position in which it is practically completely open, the various cams and switches will assume the position shown in Fig. 4 wherein switches 84—85, 108—110, 109—111, and 116—118 are open, switch 103—104 is closed and further clockwise rotation of cams 73 and 74 is prevented.

Upon a small amount of further clockwise rotation of shaft 51, cam actuating link 121 will engage the extended end of stop 81 of cam 73 and rotate cam 73 in a counter-clockwise direction for a short distance whereupon cam follower 100 will ride down inclined surface 90 of cam 73 and onto dwell 91 thereof with the result that contact 103 will move out of engagement with contact 104 to break the holding circuit previously described whereupon complete deenergization of field winding 65 of motor 64 takes place. During this reverse rotation of cam 73, cam follower 106 rests upon surface 95 of cam 74 and the notch 88 of cam 73 assumes a position substantially directly under cam follower 106. This position of the parts is shown by Fig. 5.

Deenergization of field winding 65 allows the various parts to be rotated in counter-clockwise direction under the bias of coiled spring 36 and the valve moves towards closed position. During this initial movement towards closed position, cam follower 106 rides off of surface 95 of cam 74 after it has passed over notch 88 in cam 73 and rides upon dwell 89 of cam 73 so that contacts 108 and 109 are still maintained out of engagement with contacts 110 and 111 respectively. A relatively small counter-clockwise movement of cam 73 brings its stop 87 into engagement with flexible switch arm 86 so that contact 85 is again moved into engagement with contact 84. As the valve continues to close and reaches half open position, crank pin 49 will again engage flexible switch arm 117 to move contact 118 into engagement with contact 116 and at this instant an energizing circuit for the coil of relay 72 is closed as follows: secondary 136, wire 139, safety pilot 99, wire 140, wire 141, contact 133, blade 130, wire 147, wire 149, switch arm 83, contacts 84 and 85, switch arm 86, wire 150, contact 116, contact 118, wire 151, the coil of relay 72, wire 152, and wire 146 to the other side of secondary 136. The armature 68 of relay 72 is thereupon attracted and the extended end 67 moves into the path of movement of stop member 66 whereupon further rotation of rotor shaft 62 is prevented with the result that the valve is held in half open position and the cams 73 and 74 assume the position shown in Fig. 6. It will be noted that this energizing circuit for the coil of relay 72 is independent of blade 131 and contact 134.

If the temperature to which thermostatic element 129 now responds should rise so as to separate both of blades 131 and 130 from their contacts 134 and 133, then the circuit through the coil of relay 72 and all other circuits will be broken and the valve will return to its closed position. During such closing movement, the various cams and switches will return to the positions shown in Fig. 3.

From the foregoing description of this phase of the operation of the present invention, it will be apparent that the valve is initially opened relatively widely and automatically returns to and is maintained in an intermediate position as the result of a small demand for heat. It will further be noted that the demand for heat must decrease substantially before the valve will return to closed position. The switch constituted by blade 131 and contact 135 might be termed a starting switch and the switch constituted by blade 130 and contact 133 might be defined as a holding switch. It will be noted that the holding switch is closed first and then the starting switch is closed upon an increase in the demand for heat.

Assuming however that the temperature continues to fall so that blade 132 is brought into engagement with contact 135, then an energizing circuit for field winding 65 will be established as follows: secondary 136, wire 139, safety pilot 99, wire 140, wire 141, contact 133, blade 130, blade 132, contact 135, wire 153, wire 144, field winding 65, wire 145 and wire 146 to secondary 136. Energization of field winding 65 causes the motor 64 to begin to move the valve from its half open position to its full open position. This rotation is possible even though the relay 72 is energized inasmuch as the inclined surface 154 of stop member 66 will ride under and lift the extended end 67 of armature 68 against the pull of electromagnet 72. The resulting initial rotation of cams 73 and 74 in a clockwise direction opens contacts 84 and 85 by reason of stop 87 and cam 73 moving out of engagement with flexible switch arm 86. The coil of relay 72 is thereupon deenergized. This rotation of cams 73 and 74 allows cam follower 106 to drop in notches 88 and 94 whereupon contact 109 moves into engagement with contact 111, whereby a holding circuit through blade 131 and contact 134 is established for field winding 65 as follows: secondary 136, wire 139, safety pilot 9, wire 140, wire 141, contact 133, blade 130, blade 131, contact 134, wire 142, bracket 112, contact 111, contact 109, flexible blade 107, wire 143, wire 144, field winding 65, wire 145, and wire 146 to the other side of secondary 136. Engagement of cam follower 106 with notches 88 and 94 prevents further clockwise movement of cams 73 and 74 so that cam follower 100 does not ride up surface 90 of cam 73 sufficiently to close contacts 103 and 104. When the valve has moved to full open position, the motor 64 stalls and the valve is thereby maintained in full open position, it being noted that this circuit for motor field winding 65 traverses blade 131 and contact 134 whereby the motor field 65 will remain energized and the valve will be maintained in its full open position until the temperature rises sufficiently to move blade 131 from engagement with contact 134.

When this happens, the parts will return to the position shown in Fig. 6 wherein the valve is half open and may again be fully opened if the temperature should again drop to cause blade 132 to engage contact 135 or may be completely closed if the temperature should rise sufficiently to disengage all three blades 130, 131 and 132 from contacts 133, 134 and 135. It will be noted that the switch 132—135 acts as a starting switch and the switch 131—134 acts as a holding switch for the wide open position of the valve.

From the foregoing description, it will be seen that upon a first temperature fall with the valve in closed position, the valve opens initially substantially to its full open position and automatically returns to its half open position. Thereafter, the valve may again close or move to full open position depending upon whether the temperature thereafter rises to a higher or falls to a still lower point. In the case the temperature falls to a still lower point and the valve completely opens, it will be maintained in full open position until the temperature is partially restored, at which time it will return to half open position. After having again reached half open position, the valve may thereafter completely close or return to full open position in accordance with demands for heat.

It will also be noted that throughout all of these operations, there is an initial energizing circuit which results in the establishment of one or more holding circuits so that in no case after the valve has started to open can it chatter as the result of fluttering of the thermostat contact which started the operation. While these holding circuits have been made to depend upon changes in the temperature to which the thermostat responds, they need not necessarily be so controlled and could well be dependent upon some condition other than further temperature changes to which the actuating thermostat responds.

In the event there should be a failure of electrical power and it is desired to open the valve, the extended end of lever 41 may be manually depressed and the shaft 123 moved inwardly as previously described to engage the under side of lever 41. In this manner, the valve is held in partial open position and the recycling switch 127 is moved to closed circuit position. Whenever the electrical power returns, a circuit to field winding 65 is immediately established as follows: secondary 136, wire 139, safety pilot 99, wire 140, wire 155, recycling switch 127, wire 156, field winding 65, wire 145 and wire 146 to the other side of secondary 136. The valve is therefore more widely opened and upon movement of lever 41 out of engagement with the enlarged end 125 of pin 123, spring 124 returns pin 123 to the position shown in the drawings whereupon recycling switch 127 moves to open position and the valve is free to return to closed position or any other of its positions in accordance with the demands of the thermostat 128.

The extended end of lever 41 may also be utilized to operate a secondary air damper or any other desired mechanism. It will also be understood that a cover completely houses the plates 39 and 40 and the mechanism supported thereby so that the valve mechanism presents a unitary structure the operating parts of which are fully enclosed with the exception that the extended end of lever 41 and the outer end of pin 123 extend without the cover for the purposes hereinbefore described.

While a specific embodiment of the invention has been herein described, it is to be understood that many changes and modifications could be made therein and particularly that the main control switch need not respond to temperature changes or that it can respond to temperature changes other than those in the space to be heated without departing from the spirit of the invention. I am therefore to be limited only within the scope of the appended claims.

I claim as my invention:

1. In combination, a single valve normally biased to closed position, electrical means for opening said valve maintaining it in open position against its bias, and means in control of said electrical means upon an initial small demand for heat for causing the electrical means to move said valve to a relatively large open position and thereafter automatically allow said valve to return to an intermediate open position and maintain it therein, and manual means for moving the valve to an intermediate open position, releasably latching the valve in such position and for closing a valve opening circuit for the electrical means upon a failure of electrical power, whereby said valve will be opened further upon a resumption of power to release said latching means and return the valve to automatic control.

2. A device of the class described, comprising, in combination, a flow controlling mechanism for controlling the flow of fluid fuel to a burner, a movable member movable along a predetermined path of travel, means associated with said movable member and flow controlling mechanism for operating the latter initially to supply a large flow of fuel to the burner and automatically to decrease the supply of fuel thereto when the movable member reaches one point in its path of travel when moving in one direction, means associated with said movable member and flow controlling mechanism for maintaining said smaller supply of fuel to the burner during return movement of said movable member until the same reaches a second point spaced from said first point, and means associated with said movable member and mechanism for again establishing a large flow of fuel to the burner if said movable member continues movement in said first direction to a third point lying beyond said first point.

3. A device of the class described, comprising, in combination, a single valve for controlling the flow of fluid fuel to a burner, a movable member movable along a predetermined path of travel, means associated with said movable member and valve for operating the latter initially to supply maximum flow of fuel to the burner and automatically to decrease the supply of fuel to an intermediate flow when the movable member reaches one point in its path of travel in moving in one direction, means associated with said movable member and valve for maintaining said intermediate flow of fuel to the burner during return movement of said movable member until the same reaches a second point spaced from said first point, and means associated with said movable member and valve for again establishing said maximum flow of fuel to the burner if said movable member continues movement in said first direction to a third point lying beyond said first point.

4. A device of the class described, comprising, in combination, a flow controlling mechanism for controlling the flow of fluid fuel to a burner, a movable member movable along a predetermined path of travel, means associated with said movable member and flow controlling mechanism for operating the latter initially to supply a large flow of fuel to the burner and automatically to decrease the supply of fuel thereto when the movable member reaches one point in its path of travel when moving in one direction, means associated with said movable member and flow controlling mechanism for again establishing a large flow of fuel to the burner upon continued movement of said movable member in the same direction to a second point which lies beyond said first point, and means associated with said movable member and flow control mechanism for maintaining said large and small flows of fuel upon return movement of said movable member to points spaced respectively from said second and first points.

5. A device of the class described, comprising, in combination, a single valve for controlling the flow of fluid fuel to a burner, a movable member movable along a predetermined path of travel, means associated with said movable member and valve for operating the latter initially to supply maximum flow of fuel to the burner and automatically to decrease the supply of fuel to an intermediate flow when the movable member reaches one point in its path of travel upon moving in one direction, means associated with said movable member and valve for again establishing said maximum flow of fuel to the burner upon continued movement of said movable member in the same direction to a second point which lies beyond said first point, and means associated with said movable member and valve for maintaining said maximum flow of fuel upon return movement of said movable member to said first point.

6. In combination, a valve biased to closed position, and adapted to control the supply of fuel to a burner, electrical valve operating means for opening said valve and maintaining the same open against its bias, a starting switch for energizing at least a portion of said electrical valve operating means to move said valve to an open position, a switch which is closed as a result of energization of said portion of the valve operating means, a holding circuit for said portion of the valve operating means controlled by said last-named switch and independent of said starting switch, means controlled by the movement of said valve for operatively deenergizing said portion of the valve operating means when said valve reaches a relatively large open position whereby said valve will return towards its closed position under its bias, a switch moved to a new circuit controlling position when said valve reaches an intermediate position, a holding switch independent of said valve movements, and a circuit controlled by the conjoint action of said two last-mentioned switches for energizing another portion of said electrical valve actuating means for maintaining said valve in an intermediate position.

7. A device of the class described, comprising, in combination, a valve biased to closed position, a movable member, a holding switch and a starting switch sequentially closed thereby, electrical valve controlling means, a circuit controlled by said starting switch for energizing at least a portion of said electrical valve controlling means to move the valve to an open position against its bias, means controlled by valve movement for operatively deenergizing said portion of the valve controlling means when said valve approaches full open position whereby the same returns toward closed position under the influence of its bias, a switch moved to closed position when said valve reaches an intermediate position, a circuit controlled by said last named switch and holding switch in series for energizing another portion of said electrical valve controlling means to maintain said valve in its intermediate position, and means controlled by said movable member for moving said valve to and maintaining the same in its maximum open position.

8. In combination, a valve biased to closed position, a movable member, an electric motor for opening said valve against its bias, a circuit for said motor controlled by said movable member, whereby said valve may be moved to open position, means for automatically deenergizing said motor when the valve has been moved to open position, a magnetic coil for preventing return movement of said valve, a switch moved to closed position during closing movement of said valve, a circuit for the magnetic coil controlled by said switch, means for manually opening said valve to an intermediate position and releasably latching the same therein upon the occurrence of a power failure, a recycling switch moved to closed position upon such manual manipulation of the valve, and a circuit for the motor controlled by the recycling switch and independent of the movable member, whereby the valve is opened upon the resumption of power to release the latching means irrespective of the position of the movable member.

9. In combination, a valve biased to closed position, a movable member, first, second and third switches sequentially closed thereby, an electric device for opening said valve and maintaining the same open, a circuit for said device controlled by said second switch, means operated when said valve has substantially fully opened for deenergizing said device, a circuit which is closed when said valve reaches an intermediate position during closing movement, a second device controlled by said circuit for preventing further closing of said valve, said circuit including said first switch, and a circuit for said first device controlled by said third switch.

10. A device of the class described, comprising, in combination, a valve biased to closed position, a movable member, a holding switch and a starting switch sequentially closed thereby, a rotary electrical motor for opening said valve against its bias, a circuit controlled by said starting switch for energizing said motor to open the valve, means controlled by valve movement for operatively deenergizing said motor when the valve approaches full open position whereby the same thereupon returns toward closed position under its bias, an electromagnetic coil arranged when energized to prevent closing of the valve, means for closing a circuit for said electro-magnetic coil through said holding switch when the valve reaches an intermediate position during closing movement, and means controlled by said movable member for moving the valve to and maintaining the same in its maximum open position.

11. A device of the class described, comprising, in combination, a valve biased to closed position, a movable member, a holding switch and a starting switch sequentially closed thereby, a rotary electrical motor for opening said valve against its bias, a circuit controlled by said starting switch for energizing said motor to open the valve, means controlled by valve movement for operatively deenergizing said motor when the valve approaches full open position whereby the same thereupon returns toward closed position under its bias, an electromagnetic coil arranged when energized to prevent closing of the valve, means for closing a circuit for said electromagnetic coil through said holding switch when the valve reaches an intermediate position during closing movement, and means controlled by said movable member for energizing said motor to open the valve against its bias and for maintaining the same open by stalling of the motor.

12. A device of the class described, comprising, in combination, a valve biased to closed position, a movable member, a holding switch and a starting switch sequentially closed thereby, electrical valve controlling means, a control switch controlled by movement of the valve controlling means and arranged to be closed upon initial movement of said valve controlling means in valve opening direction and to be opened when said valve approaches fully opened position, an initial energizing circuit for energizing at least a portion of said electrical valve controlling means to move the valve to an open position against its bias controlled by the starting switch, a holding circuit for said portion of the valve controlling means controlled by the holding switch and said control switch in series, means for interrupting the initial energizing circuit after the holding circuit is established, and a circuit which is completed through the holding switch when the valve reaches an intermediate position during closing movement for energizing another portion of the valve controlling means to maintain the valve in its intermediate position.

13. In combination, a single valve biased to closed position, first, second, and third main control switches that are sequentially closed in the order named by a single actuator upon movement in one direction, electrical valve controlling means for opening the valve and maintaining it open, an initial energizing circuit for a portion of the valve controlling means controlled by the second main control switch to open the valve against its bias, a holding circuit for said portion of the valve controlling means controlled by the first main control switch, means for deenergizing said portion of the valve controlling means when the valve has been moved to a relatively large open position, a circuit for energizing another portion of the valve controlling means through the first main control switch to prevent further closing of the valve which circuit is established when the valve reaches an intermediate position during closing movement, and a circuit for the first portion of the valve controlling means for completely opening the valve controlled by the third main control switch.

14. In combination, a single valve biased to closed position, first, second, and third main control switches that are sequentially closed in the order named by a single actuator upon movement in one direction, electrical valve controlling means for opening the valve and maintaining it open, an initial energizing circuit for a portion of the valve controlling means controlled by the second main control switch to open the valve against its bias, a holding circuit for said portion of the valve controlling means controlled by the first main control switch, means for deenergizing said portion of the valve controlling means when the valve has been moved to a relatively large open position, means for establishing an energizing circuit for another portion of the valve controlling means through the first main control switch to prevent further closing of the valve when the valve reaches an intermediate position during closing movement, a circuit for the first portion of the valve controlling means for completely opening the valve controlled by the third main control switch, and means for establishing a maintaining circuit for the first portion of the valve controlling means through the second main control switch upon movement of the valve to full open position from said intermediate position for maintaining the valve fully open until opening of the second main control switch.

15. In combination, a valve biased to closed position, a movable member, first, second, and third switches closed thereby in sequence upon movement of the movable member in a single direction, a rotary electrical motor for opening the valve against its bias, an initial energizing circuit for the motor controlled by the second switch for opening the valve when the same is closed, means for establishing a holding circuit for the motor through the first switch upon initial movement of the motor in valve opening direction, means for deenergizing the motor when the valve has been moved to a relatively large open position whereupon the valve is moved toward closed position under its bias, an electrical device operative to prevent closing of the valve when energized, means for establishing an energizing circuit for said device through said first switch when the valve reaches an intermediate position during closing movement whereby the valve is maintained in such intermediate position until the first switch opens, and an energizing circuit for the motor to move the valve from said intermediate open position to full open position controlled by the third switch.

16. In combination, a valve biased to closed position, a movable member, first, second, and third switches closed thereby in sequence upon movement of the movable member in a single direction a rotary electrical motor for opening the valve against its bias, an initial energizing circuit for the motor controlled by the second switch for opening the valve when the same is closed, means for establishing a holding circuit for the motor through the first switch upon initial movement of tne motor in valve opening direction, means for deenergizing the motor when the valve has been moved to a relatively large open position whereby the valve is moved toward closed position under its bias, an electrical device operative to prevent closing of the valve when energized, means for establishing an energizing circuit for said device through said first switch when the valve reaches an intermediate position during closing movement whereby the valve is maintained in such intermediate position until the first switch opens, an energizing circuit for the motor to move the valve from said intermediate open position to full open position controlled by the third switch, a switch moved to closed position when the valve reaches full open position in moving thereto from said intermediate open position, and a maintaining circuit for the motor controlled by the second switch and last-named switch in series.

17. In combination, fluid flow controlling mechanism normally biased to minimum flow position, electrical means associated therewith for controlling the operation thereof, a normally open switch that is closed upon initial energization of the electrical means, a normally closed switch that is opened after closure of the normally open switch upon energization of the electrical means, holding and starting switches, a main actuator arranged to close the holding and starting switches sequentially in the order named upon movement of the actuator in one direction, a circuit controlled by the starting switch and normally closed switch for energizing a portion of the electrical means to move the fluid flow controlling mechanism toward maximum flow position, a holding circuit for energizing said portion of the electrical means completed by the holding switch and normally open switch upon closure of the normally open switch whereby said portion of the electrical means is maintained energized after opening of the normally closed switch, means for operatively deenergizing said portion of the electrical means when the fluid flow controlling mechanism reaches a position permitting a relatively large flow of fluid whereby the fluid flow controlling mechanism returns towards minimum flow position under its bias, switching mechanism moved to close circuit position when the fluid flow controlling mechanism has reached a position permitting an intermediate flow of fluid during such return movement, and a circuit for energizing another portion of the electrical means to maintain the fluid flow controlling mechanism in such intermediate position controlled by said switching mechanism and the holding switch.

18. In combination, a valve biased to closed position, a rotary electrical motor for moving the valve to open position against its bias, a normally open switch arranged to be closed upon initial operation of the motor in valve opening direction, a normally closed switch arranged to be opened after the normally open switch is closed, holding and starting switches, an initial energizing circuit for the motor controlled by the starting switch and normally closed switch, a holding circuit for the motor completed through the holding switch upon closure of the normally open switch, means for operatively deenergizing the motor when the valve approaches full open position whereby the valve is moved towards closed position by its bias, a circuit which is completed when the valve reaches an intermediate position during closing movement, an electrical device in said circuit, and connections between said device and valve by which the device prevents further closing of the valve when the device is energized.

WILLIS H. GILLE.

CERTIFICATE OF CORRECTION.

Patent No. 2,029,615.                February 4, 1936.

WILLIS H. GILLE.

It is hereby certified that error appears in the printed specification of the above numbered patent requiring correction as follows: Page 7, second column, line 71, claim 16, for "whereby" read whereupon; and that the said Letters Patent should be read with this correction therein that the same may conform to the record of the case in the Patent Office.

Signed and sealed this 14th day April, A. D. 1936.

Leslie Frazer (Seal)                Acting Commissioner of Patents.